(12) United States Patent
Albig et al.

(10) Patent No.: US 8,606,957 B2
(45) Date of Patent: Dec. 10, 2013

(54) METHOD AND DEVICE FOR TRANSMITTING FILES VIA A NETWORK

(76) Inventors: Christophe J. Albig, Bad Vibel (DE); Arndt Seehawer, Münster (DE)

( * ) Notice: Subject to any disclaimer, the term of this patent is extended or adjusted under 35 U.S.C. 154(b) by 643 days.

(21) Appl. No.: 11/719,890

(22) PCT Filed: Nov. 22, 2005

(86) PCT No.: PCT/EP2005/012484
§ 371 (c)(1),
(2), (4) Date: Apr. 22, 2009

(87) PCT Pub. No.: WO2006/056400
PCT Pub. Date: Jun. 1, 2006

(65) Prior Publication Data
US 2009/0216872 A1   Aug. 27, 2009

(30) Foreign Application Priority Data
Nov. 22, 2004   (DE) .......................... 10 2004 056 336

(51) Int. Cl.
*G06F 15/16*   (2006.01)
(52) U.S. Cl.
USPC ........................................................ 709/232
(58) Field of Classification Search
USPC .......................... 709/230, 231, 232, 234, 235
See application file for complete search history.

(56) References Cited

U.S. PATENT DOCUMENTS

| | | | |
|---|---|---|---|
| 2003/0091031 A1* | 5/2003 | Kuhlmann et al. | 370/352 |
| 2003/0163581 A1* | 8/2003 | Moran et al. | 709/235 |
| 2005/0289011 A1* | 12/2005 | Sporny | 705/26 |

FOREIGN PATENT DOCUMENTS

| | | |
|---|---|---|
| DE | 199 41 461 | 3/2001 |
| DE | 69531027 T2 | 1/2006 |
| EP | 0 974 917 | 1/2000 |
| EP | 1 307 021 | 5/2003 |
| EP | 1 333 638 | 8/2003 |
| JP | 2000 137665 | 5/2000 |

OTHER PUBLICATIONS

International Search Report; PCT/EP2005/012484; Mar. 14, 2006.
German OA 10 2004 056 336.5-31 dated Jan. 11, 2006.

* cited by examiner

*Primary Examiner* — Larry Donaghue
*Assistant Examiner* — Marshall McLeod
(74) *Attorney, Agent, or Firm* — Cantor Colburn LLP

(57) ABSTRACT

A method for transmitting files via a network is proposed. In a first step, the size of a file to be transmitted is transmitted. Following this, the value of a maximum permitted data traffic is calculated from the size of the file and a factor X. Finally, the transmission process of a file is stopped as soon as the data volume transmitted exceeds the maximum permitted data traffic.

19 Claims, 3 Drawing Sheets

_US 8,606,957 B2_

METHOD AND DEVICE FOR TRANSMITTING FILES VIA A NETWORK

TECHNICAL FIELD OF THE INVENTION

The present invention relates to a method and a device for transmitting files via a network.

BACKGROUND OF THE INVENTION

Methods for transmitting files via a network are known. They are frequently used for distributing or providing multimedia files such as, for example, music files or film files, via a network. Using the known methods, it is possible to implement virtual shops for music and films, especially via the Internet. To guarantee delivery when such a file is purchased and to reduce possibilities of fraud, a secure transmission method is needed.

An example of a method for transmitting files is also disclosed, for example, in US 2003/0046415 A1.

Methods for transmitting files via a network are often coupled to a payment system so that a remuneration for transmitted files can be paid to the provider. In addition, systems are known in which film files are transmitted directly to art house movie theatres. The problem is there that such distribution systems for music and/or film files are associated with very large volumes of data, that is to say a very high data traffic in the networks. This often leads to overloading of the networks, access times which are too long and to a high consumption of storage space.

SUMMARY OF THE INVENTION

The present invention provides a method and a device for transmitting files via a network which allow economic handling of resources for transmitting and/or storing files, particularly image and/or sound data.

According to the invention, a method for transmitting files via a network is proposed which can be the Internet. In a first step, the size of a file to be transmitted is first determined. The file can be, for example, the digital stored version of a film which has first been procured via a virtual shop. As the next step, a maximum permissible data traffic is calculated from the determined size of the file to be transmitted. The calculation can be carried out in a particularly simple manner by multiplying the size of the file by a factor X. Following this, the file is transmitted via the network during which process, however, the volume of the data traffic produced is monitored. In the present application, the term "data traffic produced" is understood to be the data traffic which is only produced during the transmission of the file. This term is not intended to cover other volumes of data such as, for example, caused by a suitable protocol to be used but a measurement of the actual data traffic produced can be possible and appropriate in other exemplary embodiments. Monitoring the data traffic produced is used for stopping the transmission process as soon as the value or the volume of the data traffic produced exceeds the value of the maximum permissible data traffic. This offers the advantage that any downloadings of wrong files carried out erroneously and/or downloadings carried out twice and/or downloadings in which the same parts of a file are erroneously transmitted several times are recognized and can thus be stopped. This advantageously makes it possible to avoid unnecessary network data traffic. Thus, this makes it possible to use the transmission capacity resource of the network used in an economic manner which counteracts overloading of the networks. In addition, applying the method makes it possible to avoid downloadings carried out accidentally twice or several times. These would undesirably double or multiply the volume of data transmitted. This error can also be detected during the monitoring of the data traffic produced so that downloadings carried out accidentally twice or several times can be aborted in time. This also makes it also possible to save storage space which would be consumed by accidentally storing one and the same file twice. At the receiver, this ensures a non-redundant data storage of the files received as a result of which the access times to the received files can be optimized overall. It also guarantees that no storage space can be wasted by storing one and the same file several times.

A preferred exemplary embodiment provides that the data traffic is monitored during the transmission of the file and is measured and added up, for example in data blocks, in individual files.

A further preferred exemplary embodiment provides that the factor X by which the value of the file size is multiplied is greater than 1 and less than 2. This ensures in every case that the value of the permitted data traffic is greater than once but less than twice the file size. A transmission process or downloading process accidentally triggered twice can therefore be detected and aborted in every case by applying the method.

It is also conceivable, before executing a downloading process, to check whether the value of the permissible data traffic is sufficient for being able to transmit the desired file. If this is not the case, the downloading can be blocked right from the start. This especially saves resources since there can be no unnecessary data traffic at all in this case.

A preferred exemplary embodiment of the invention provides to supplement the method via the following steps: before downloading begins, a first record with a data field "permitted data traffic" is set up. Following this, the previously determined value of the maximum data traffic is set up or stored in the data field "permitted data traffic". In addition, the first record preferably also contains at least one of the following further data fields:

"sequence number" for indexing various first records,

"user" for storing a user name, particularly a user name of a receiver of the file to be transmitted, "file name" for storing the name of the file to be transmitted.

The said data fields are possibly also filled with the said data. The four data fields of the first record can have corresponding formats, for example integer, string and/or real.

The first record can be advantageously used as control record for the transmission process of the file. For this purpose, in a further preferred exemplary embodiment, the data traffic produced is subtracted from the value of the data field "permitted data traffic", for example in steps of individual data blocks to be transmitted, during the transmission process of the file. As soon as the value of the data field "permitted data traffic" of the first record drops below a threshold value, particularly the value zero, the downloading process can be stopped. The transmission process of the file can therefore be controlled by monitoring the currently entered value for the data field "permitted data traffic". As soon as the value drops below the threshold value which is equivalent to a waste of transmission sources, an unwanted downloading process, which, for example, has been triggered twice, can be advantageously stopped. In addition, a multiple call up of a file paid only once can thus be prevented.

A further preferred exemplary embodiment provides that the data field "file name" of the first record is deleted as soon as the transmission process has been successfully concluded. This measure too, can be advantageously utilized for controlling the transmission of files via a network. For this purpose, it is possible to inquire at the beginning of each transmission process to what extent one or more first records are present which contain a file name. If these are not present, no transmission process can be started. It is therefore possible via the administration of one or more first records to completely eliminate unwanted downloading processes and thus to save network resources.

A further preferred exemplary embodiment provides that a second record with at least one of the following data fields is set up and filled additionally:

"file name";

"buyer" for storing a name of a buyer of the file or a customer number allocated to this buyer;

"date" for storing the purchase date.

The purchase date can deviate from the data of the actual transmission process. The second record is advantageously set up only when a buyer buys, and also pays for, a file to be transmitted. In the second record, it is thus possible to document that a particular buyer has conducted a purchase of a file on a particular date.

It is preferably provided that the first record is set up only when a second record is present. It can thus be guaranteed that only purchased files are transmitted via the network. This makes it possible to prevent the transmission of unpaid files which especially cause unwanted network traffic.

An additionally preferred exemplary embodiment provides that a third record with the data fields "seller" for entering the seller or the originator of the file, respectively, and "file name" for storing the file name is also additionally set up and filled.

In a particularly preferred manner, the second record and the third record or in each case a multiplicity of such records can be relationally linked via the data field "file name".

This relational linking advantageously enables all purchased files to be evaluated per seller or supplier, respectively. The third record or the corresponding evaluation can also be provided so as to be retrievable at any time by the suppliers. Test buyers instructed by a supplier or seller can advantageously make purchases, the correct accounting of which can be easily checked by means of the relational combination of the second and third records.

In a further preferred exemplary embodiment, it is provided that a client-server connection is established before the transmission of a file via the network. The client-server connection can be established by a corresponding protocol, for example a Secure Sockets Layer (SSL) protocol. For this purpose, it is possible to carry out a password inquiry. As an alternative, it is also possible, during the registration, to issue a so called session ID, which, for example, consists of a randomly generated number. This session ID can be additionally stored in the first record. To establish a connection, that is to say for transmitting a file, the server can then release a so called rsync link of the form RSYNC:\\Internetaddress/"Session-ID" for each individual file. Knowing the session ID, the file can then be transmitted once from the server to the client in accordance with the method mentioned above via the corresponding rsync link.

It is preferably possible to store the first, second and/or third record in a database. However, it is also possible to store the records as individual files or in any other suitable manner.

The invention also relates to a control device which is set up for carrying out a method according to one of the method claims via a network and in dialog with a correspondingly set up server. The control device can be connected at any point between a server supplying the file and a client receiving the latter. The client can preferably be implemented in the control device. In this arrangement, the control device is set up jointly with the server in such a manner that the method previously described can be carried out. Thus, the advantages described above are produced by the control device.

In a preferred exemplary embodiment, the control device has a mass storage device. As an alternative, it is possible that the control device is only allocated to the mass storage device. The mass storage device can be, for example, a hard disk or a removable data medium, especially a memory stick, a flash memory module or the like. The transmitted file can be preferably stored in the mass storage device. The control device is preferably a data processing device arranged with corresponding software, for example a personal computer.

A further preferred exemplary embodiment provides that the control device has an imaging interface. The control device can be connected via the imaging interface, for example to a screen, to a television set and/or to an audio replay device. A transmitted file can thus advantageously be converted into corresponding audible and visual signals, and reproduced.

A further preferred exemplary embodiment provides that the control device has a data interface. The data interface can also be coupled to a television set correspondingly equipped for receiving data. In addition, the control device can be coupled to a computer. for example a personal computer, via the data interface. The received files can thus be advantageously transmitted, for example, to the television set or to the computer.

An additionally preferred exemplary embodiment provides that the control device has a network interface, particularly an interface to the Internet. Via this interface, the control device, functioning as a client, can establish a connection to the correspondingly set up server.

Finally, the invention also relates to a server which is set up for carrying out a method according to the invention via a network and in dialog with a correspondingly set up control device. The server preferably has an interface to the Internet. The carrying out of the method results in the advantages already discussed above.

The transmission method described here represents a solution which, in particular, can be used if a delivery of the purchased virtual goods by means of a solution based, for example on legal P2P or bit torrent, is not possible due to the file architecture.

BRIEF DESCRIPTION OF THE FIGURES

In the text which follows, a preferred exemplary embodiment of the invention will be explained in greater detail with reference to the drawing. Identical or functionally similar features are provided with the same reference symbols.

DETAILED DESCRIPTION OF THE PREFERRED EMBODIMENT

Figure 1:
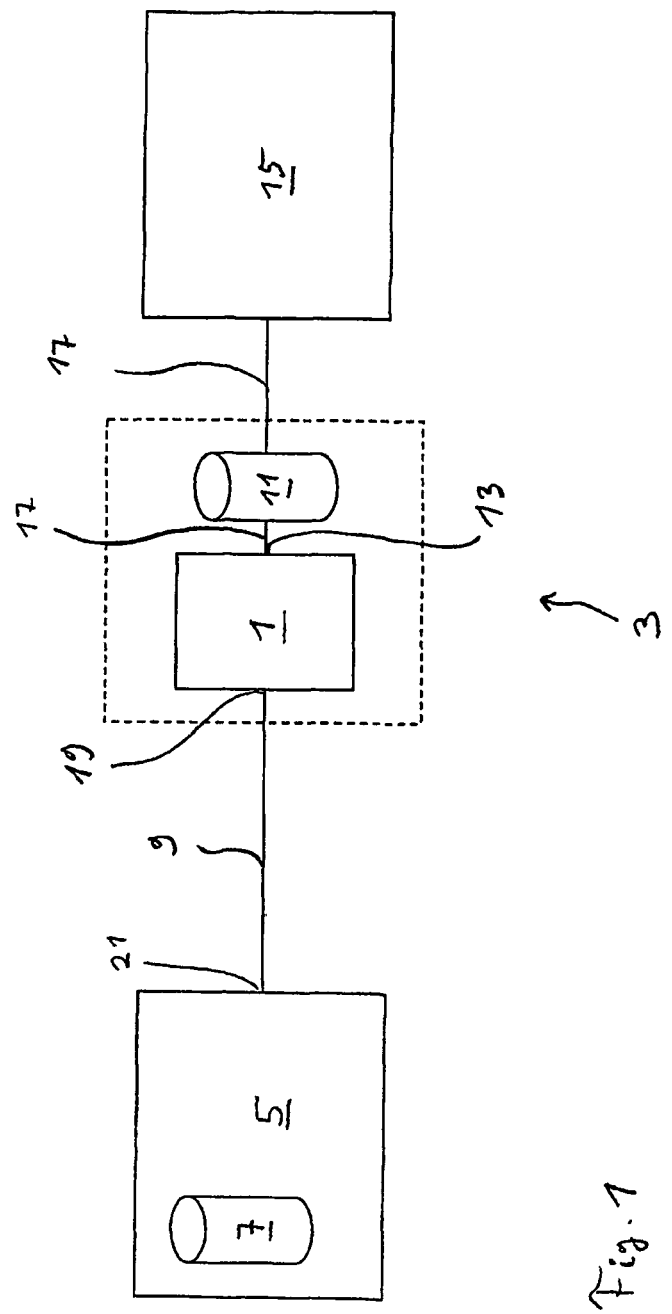
FIG. 1 shows an arrangement with a control device and a server.

FIG. 1 shows an arrangement 3 for transmitting files via a network. The arrangement 3 has a control device 1 and a server 5 with a data memory 7. The server 5 of the arrangement 3 is connected to the control device 1 via a network connection 9. The network connection 9 can be any network, for example the Internet. The connection between the server 5 and the control device 1 via the network connection 9 can be established in familiar manner, for example via an SSL protocol, with a password inquiry. The control device 1 is set up together with the server 5 for transmitting files, which are located in the data memory 7 of the server 5, via the network or via the network connection 9, in such a manner that it is ensured that a file to be transmitted can only be transmitted once. This is done by means of a method, still to be explained in greater detail with reference to one of the FIGS. 2-4, for transmitting files via a network.

The control device 1 is also assigned to a mass storage device 11, for example a hard disk, a removable data medium, particularly a memory stick, a flash memory or the like. The arrangement 3 is used for copying files from the data memory 7 of the server 5 via the control device 1 to the mass storage device 11. The control device 1 has a first interface 13 which can be allocated to the mass storage device 11 and/or directly to an image reproducing device 15. The allocating is correspondingly carried out by a data line 17. The control device 1 also has a second interface 19 which is allocated to the network connection 9. The server 5 also has an interface 21 which is allocated to the network connection 9. The connection between the server 5 and the control device 1 can thus be established via the interfaces 19 and 21 and the network connection 9.

The image reproducing device 15 can be preferably a television set, film projector or a screen. In a further exemplary embodiment, an audio reproducing device can be provided instead of the image reproducing device 15. In the case where the image reproducing device 15 is a monitor, the first interface 13 of the control device 1 can be constructed as imaging interface, for example as monitor interface. As an alternative, the first interface 13 of the control device 1 can be designed for transmitting only data to the mass storage device or from the mass storage device to the image reproducing device. In this case, the image reproducing device could be advantageously a television set with integrated mass storage device. However, the image reproducing device 15 could also be a personal computer (PC) with a screen connected thereto or a movie projector. The control device 1 can be advantageously implemented directly in the PC or movie projector.

Figure 2:
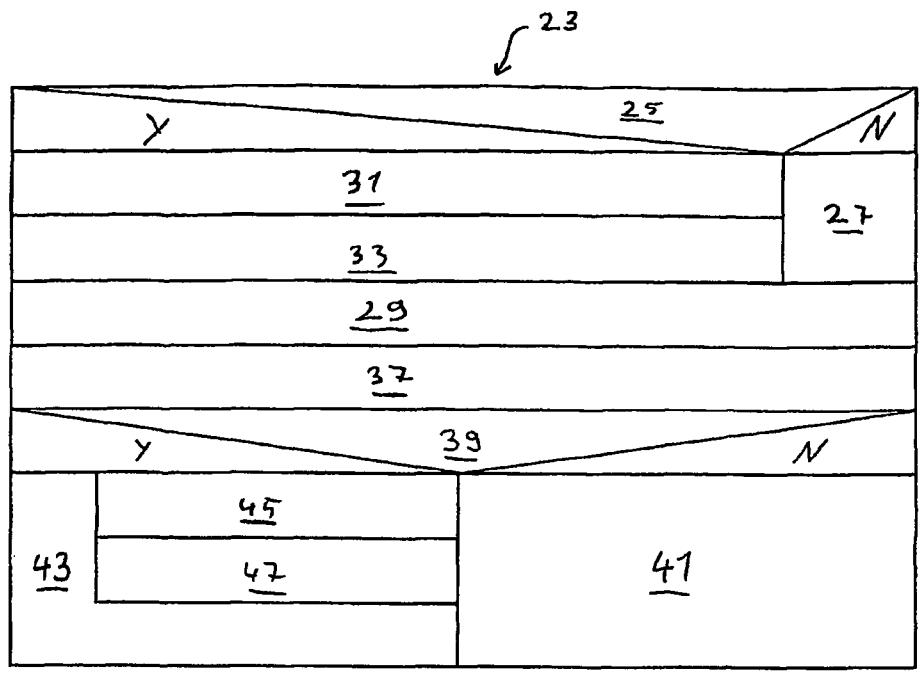
FIG. 2 shows a block diagram of an overall sequence for buying and downloading a file, particularly a film, via the Internet.

FIG. 2 shows a block diagram 23 for illustrating an overall sequence for purchasing a file, particularly a film, in a virtual store. As the first step, an inquiry 25 is carried out which is used for determining whether a potential customer is approaching the store as a new customer. The inquiry can be answered with yes and no which is symbolized by the letter "Y" for yes and "N" for no. In the case where the customer who is approaching the virtual store is an existing customer, the inquiry 25 is answered with no. In this case, the sequence shown in the block diagram branches to a blank step 27 which leads directly to a step 29, buying a film. In the case where the inquiry 25 is answered with yes as symbolized by "Y", two further steps 31 and 33 are first carried out. In a step 33, the new customer is required to download a test film and to play it accordingly.

In the case where the downloading of the test film and the subsequent playing were successful, the new customer can change to a step 33 in which he can register in the virtual store. Registrations of new customers in virtual stores in the Internet are known and can be carried out, for example, via secure connections, particularly an SSL connection. For this reason, the precise execution of step 33 will not be discussed in greater detail at this point.

The second step, which is carried out in the case where an inquiry 25 is answered with yes, opens into step 29, buying a film or a file. In step 29, the customer of the virtual store can select a film and/or a music title for downloading via corresponding menus and pay for it correspondingly. Methods for selecting and paying via the Internet are also known. These can be carried out, for example, by special service providers, via credit card numbers, by specifying a bank connection or by similar suitable means so that they will also not be discussed in further detail at this point.

As soon as the customer has concluded the purchase and the payment for a file in step 29, a step 37 follows in which a first record is created. The first record has at least the data field "permitted data traffic". It preferably also additionally has the data fields "sequence number" for numbering the record, "buyer" for storing a buyer number or the name of the buyer, and "file name" for storing the name of the file bought. The entry in the data field "permitted data traffic" contains a value which results from the size of the purchased file times a factor X. The factor X is here preferably located between a value of greater than 1 and less than 2. In a preferred exemplary embodiment, a second record is additionally also created which also contains the data fields "file name" and "buyer". In addition, the second data record also contains the data field "date" in which the purchase date can be stored. The purchase of a file by the buyer is concluded with step 37.

As a further action, the buyer must now obtain the purchased file. For this purpose, a connection can be established between a client and a server containing the file via the Internet. The connection between the client and the server can be established in familiar manner, for example by a password inquiry or by issuing a session ID connected with a so called rsync link.

In a step following the purchasing process of the film by the customer—represented by steps 29 and 37, an inquiry 39 is carried out. The inquiry 39 checks whether a connection can be established successfully between the server and the client via the Internet. The letter "N" indicates that the sequence, in the case where the connection has not been successfully established, for example when a wrong password has been input, branches to step 41 which generates a corresponding error message and terminates the sequence. Naturally, the customer, after step 41, can optionally again begin to set up a connection between client and server, that is to say to repeat the inquiry 39. In the case where the connection between server and client could be established successfully, the sequence of the block diagram 23, as indicated by the letter "Y" branches into a loop 43 which is carried out until a certain abort criterion is met.

As a first step, the loop 43 contains step 45 in which the purchased file or individual data blocks of the purchased file are transmitted from the server to the client. The downloading is here controlled by the first record, namely in such a form that the file designated in the first record is transmitted.

In a further step 47, the status of the first record is also checked. During this process, the data volume already transmitted is subtracted from the data field "permitted data traffic" with each execution of step 47. In addition, it is checked whether the value of the permitted data traffic is still greater than zero. If the value "permitted data traffic" should drop below zero, the value permitted data traffic is removed from record 1. Should it be found during the execution of step 47 that the downloading of the purchased file which is entered in record 1 could be carried out completely and successfully, the file name is deleted completely from the control record, that is to say from the first record. Step 45 of loop 43 is designed in such a way that downloading can only take place if the value of permitted data traffic is greater than zero. The abort criterion of loop 43 is designed in such a manner that the loop is left as soon as there is no further first record with a file name or as soon as there is no longer a first record with a value of the "permitted data traffic" of greater than zero. It can be seen that due to the controlling via loop 43 with steps 45 and 47, and with the aid of the changes of the first record, downloading of a file for each first record originally present with entered file name can only take place once. Thus, the loop 43 is run through until downloading has taken place for each existing first record, that is to say for each purchased file.

The block diagram 23 does not show means which may be present for manually aborting the loop 43. In the case of such a manual abort or of an unwanted dropping of the network connection, a downloading already begun can be picked up again at any time and controlled further via the first record after a repeated execution of the inquiry 39.

Figure 3:
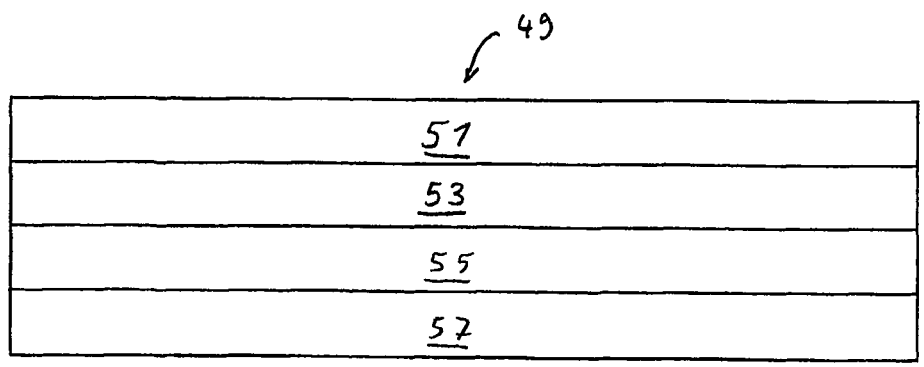
FIG. 3 shows a block diagram for a method for buying a film in a virtual shop.

FIG. 3 shows a block diagram 49 which shows a sequence for purchasing a film in a virtual store. In a first step 51, the customer can select a film via a corresponding menu.

This is followed by a step 53 in which the customer can pay for the film in familiar manner. In a further step 55, the first record is created. In a further step 57, a second record with the data fields "file name", "buyer" and "date" is then optionally created. In the data field "date", the purchase date can be stored. In addition, the server can contain a third record with the data fields "file name" and "buyer" or a multiplicity of such records which stores the corresponding supplier for each file offered. Via the "file name" of the corresponding third record, a relational link to the second record or to a multiplicity of such second records, which are generated with each individual purchase, can be established. This enables the supplier to evaluate how often and by whom or by which customer numbers which can be evaluated anonymously, which files have been purchased. Such an evaluation also makes it possible that the suppliers can check the operation of the method, that is to say, for example, the correct accounting for the purchases of films via the virtual store through such test purchases.

Figure 4:
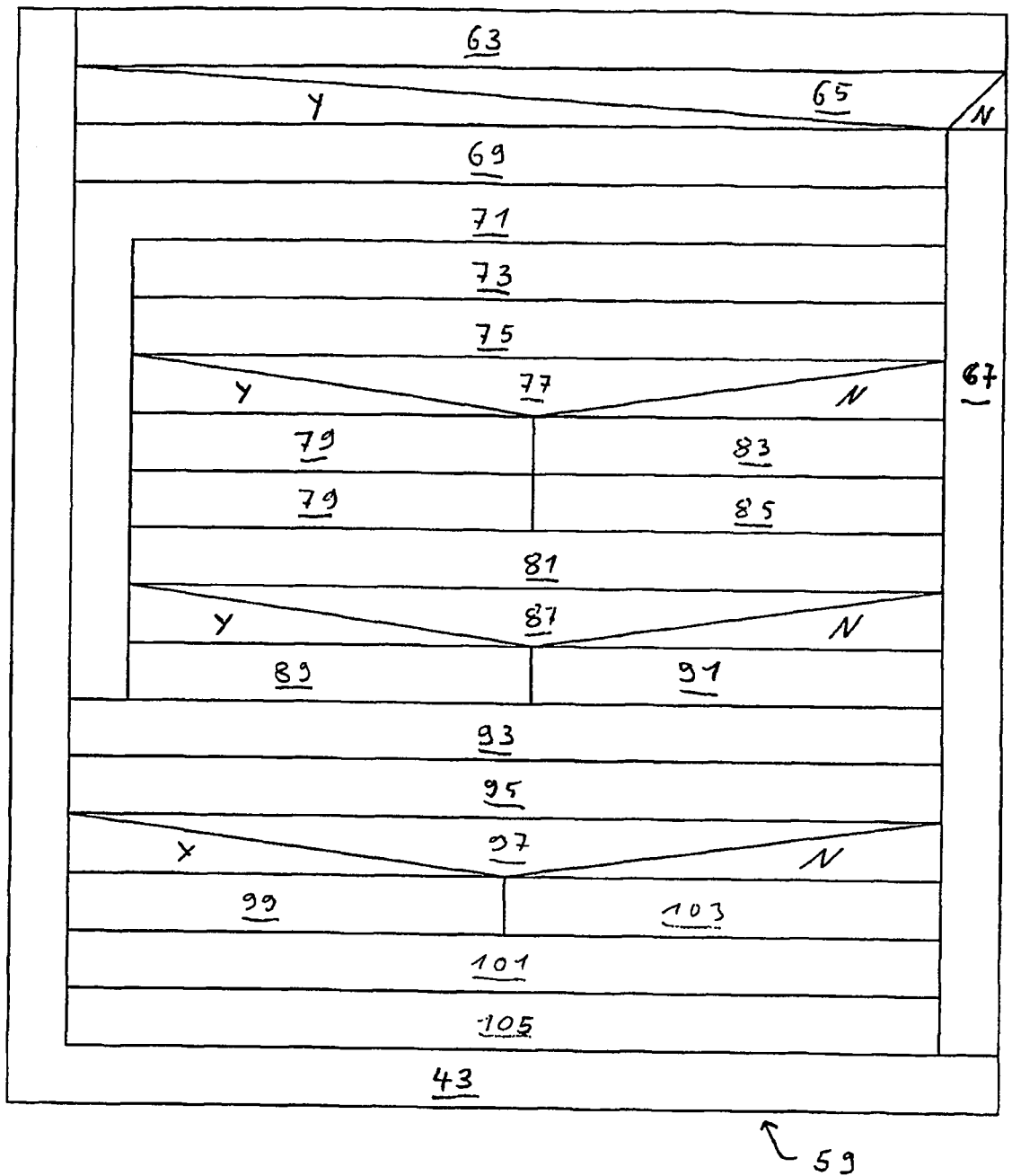
FIG. 4 shows a block diagram of a method for transmitting one or more files via a network.

FIG. 4 shows a block diagram 59 for a method for transmitting a file via a network. The block diagram 59 shows the loop 43, shown in FIG. 2, in greater detail. In a first step 63 of the loop 43, a client sends a status inquiry to the server. The server subsequently processes an inquiry 65 which is directed to it as to whether at least one first record is stored in the server. In the case where this question is answered with no, which is symbolized with the letter "N", the block diagram 59 opens into a blank step 67. In the case where at least one first record with the data fields as described before exists, the sequence opens into a step 69. In step 69, the server adds up the number of downloadable files for the current user. For this purpose, the server reads the first record or records, for example from a database. The server then transmits the number of downloadable files, the associated file names and the associated file sizes and corresponding associated checksums for the respective file. In step 69, the client thus ensures that the requested file exists and has the file size transmitted by the server. This can be done via the checksum.

Step 69 opens into a loop 71 which is run n times for downloading a file, n representing the number of individual data blocks of the file to be downloaded. In a first step 73 of loop 71, a data block n of the file to be transmitted is transmitted from the server to the client. In a subsequent step 75, both the server and client calculate the checksum of the data block n currently transmitted. A subsequent inquiry 77 compares the checksums calculated in each case. In the case where these checksums match—symbolized by the letter "Y"—the inquiry 77 branches to two blank steps 79 which open into a step 81 at which the data field "permitted data traffic" of the first record is reduced by the size of the data block 1. The operation $$\text{permitted data traffic} = \text{permitted data traffic} - \text{block size}_n$$

is thus performed. In the case where the inquiry 77 is answered with no, as symbolized by the letter "N", it branches to a step 83 at which the block n is again transmitted from the server to the client. This is followed by a step 85 at which the block n, detected to be faulty, is overwritten by the block n transmitted again. Similarly, an alignment of the checksums is again carried out in step 85. Steps 83 and 85 take place until the data block n has been correctly transmitted and stored or an abort criterion is exceeded.

Following this, step 85 also opens into step 81. Advantageously, only the data traffic actually generated by a correct downloading of a block n of the file to be transmitted is subtracted from the data field of permitted data traffic. The repeated downloading of a defective data block does not find entry into the data field "permitted data traffic" of the first record.

Step 81 opens into an inquiry 87 which checks whether the data field "permitted data traffic" of the first record drops below a certain threshold value. In the present case, it is checked whether the entry into the data field "permitted data traffic" drops below the value of zero, that is say permitted data traffic <0.

In the case where the inquiry 87 supplies the value yes which is indicated by the letter "Y", the inquiry 87 branches into a step 89 which aborts the current downloading. Thus no further data block (n) is requested and loop 71 is left. Inquiry 87 thus monitors for each data block n whether transmission volume is still available and correspondingly aborts the downloading if the volume has already been consumed. This case occurs mandatorily if file n has already been previously transmitted and, for example due to a fault, is accidentally present again for transmitting. Thus, this measure prevents network and/or storage capacity from being wasted due to double or multiple transmissions of files.

In the case where the inquiry supplies the value no, the process branches, either in accordance with the processing index n of loop 71, via a blank step 91 to the first step 73 of loop 71 with index n+1 or, after the last block (n), to a step 93 outside the loop 71. At step 93, the client determines the checksum of the entire file composed of data blocks 1 to n. In a subsequent step 95, the client checks whether the checksum of the total file, already transmitted by the server, matches the checksum determined in step 93. In the case of matching checksums, an inquiry 97 branches via a blank step 99 to a step 101 at which the client transmits to the server that the downloading of the file with the index m entered in the data field "sequence number" of the first record has been successfully carried out. In the case of a negative inquiry 97—letter "N"—the process branches to a step 103 at which an error correction routine is carried out. For this purpose, each block n of the file m can be checked again by means of the respective checksums and, if necessary, exchanged. If the correction is unsuccessful, an error message can be generated and the process can be aborted or continued with the next file.

In the case of a successful correction, step 101 is also carried out. After that, a step 105 is carried out at which the server deletes the data field "file name" of the first record with the index m.

After that, step 63 is carried out again by loop 43, that is to say, for example, with a downloading of a file corresponding to a first record having the index m+1. Loop 43 is broken off as soon as there is no further first record with an entered file name at the server end. In this case, the server, after executing step 63 within loop 43, sends the signal "no files" which can be used as abort criterion. Thus, loop 43 is possibly left after a last execution of step 63 after carrying out all pending downloadings.

It is conceivable to use the method described and the devices described for virtual stores, particularly stores with a customer range with a chargeable customer account, with a test program before carrying out the first purchase, a test function for providers of goods in commission, with a new customer registration, a purchase handling area and/or with a selection area for products offered.

The exemplary embodiments specified can be varied and can be combined with one another to form further exemplary embodiments. Similarly, the sequence may be changed, if necessary, in process steps mentioned by way of example if the same functionality is achieved by this means.

The invention claimed is:

1. A method for transmitting files via a network, comprising:
   determining a size of a file to be transmitted said determining being implemented by a computing resource,
   determining a maximum permitted data traffic value by multiplying the size of the file by a factor that is greater than 1 and less than 2, said determining being implemented by said computing resource
   ensuring that the maximum permitted data traffic value is always greater than one time the size and less than twice the size of the file to be transmitted via said multiplying,
   stopping a transmission of the file if a volume of data traffic produced exceeds a maximum permitted data traffic.

2. The method as claimed in claim 1, further comprising: monitoring and adding up transmitted data traffic during the transmission of the file.

3. The method as claimed in claim 1, further comprising: creating a first record with a data field "permitted data traffic", and
   storing a determined value of the maximum permitted data traffic in the data field "permitted data traffic".

4. The method as claimed in claim 3, further comprising: creating and filling the first record with at least one of the following further data fields:
   "sequence number";
   "user";
   "file name".

5. The method as claimed in claim 3, further comprising: subtracting data traffic produced from the values of the data field "permitted data traffic" during a transmission process
   and
   stopping the transmission process as soon as the value of the data field "permitted data traffic" drops below a threshold value.

6. The method as claimed in claim 4, further comprising: deleting the data field "file name" from the first record as soon as a transmission process has been successfully concluded.

7. The method as claimed in claim 4, further comprising: creating and filling a second record with data fields:
   "file name",
   "buyer",
   "date".

8. The method as claimed in claim 7, further comprising: creating the first record only if there is already a second record.

9. The method as claimed in claim 7, further comprising: creating and filling a third record with data fields:
   "Seller",
   "file name".

10. The method as claimed in claim 9, further comprising: linking the second record and the third record via a relation of the data field "file name" for generating an evaluation of all purchased files per supplier.

11. The method as claimed in claim 1, further comprising: establishing a connection between a server and a client by a password inquiry or issuing a session ID and a corresponding assignment of an rsync link.

12. The method as claimed in claim 7, further comprising: storing the records in a database or in individual files.

13. A control device, set up for carrying out, in a dialog via a network with a correspondingly set up server, a method as claimed in claim 1.

14. The control device as claimed in claimed 13, wherein the control device has a mass storage device.

15. The control device as claimed in claim 13, wherein the control device has a first imaging interface to a television set or a screen.

16. The control device as claimed in claim 15, wherein the first interface is constructed as data interface to a television set or computer.

17. The control device as claimed in claim 15, wherein the control device has a second interface to the Internet.

18. A server which is set up for carrying out, in a dialog via a network with a correspondingly set up control device, a method as claimed in claim 1.

19. The server as claimed in claim 18, wherein the server has an interface to the Internet.

* * * * *